INVENTOR.
ROBERT J. HOEFER
BY Alfred N. Feldman
ATTORNEY

United States Patent Office 3,214,098
Patented Oct. 26, 1965

3,214,098
ENVIRONMENTAL CONDITION CONTROL SYSTEM
Robert J. Hoefer, Shorewood, Minn., assignor to Honeywell Inc., a corporation of Delaware
Filed Apr. 24, 1964, Ser. No. 362,251
7 Claims. (Cl. 236—1)

The present invention is broadly directed to a condition control system incorporating two modes of operation, and more particularly is a temperature and light control system which utilizes a night setback for temperature and assures that the illumination means or lights in the controlled area are also turned off during the night setback mode of operation.

The use of night setback in temperature control systems has been extensively utilized in buildings of a commercial nature and in school buildings. The fact that the building is occupied during a limited number of hours during the daytime and unused during the nighttime hours has led to temperature control systems which operate at two different levels. These temperature control systems usually operate at one fixed level, as preset by a pressure to pneumatic control devices during the day, and the system is reduced a set number of degrees of temperature during the nighttime by a change of pneumatic pressure to the overall system. This type of system is well known as a day-night temperature control system or as a night setback type of temperature control system. In large commercial buildings and in schools pneumatic temperature control systems with the night setback feature have been in use for many years. Due to the increasing cost of operating such buildings a concern has now arisen for providing some economical means of assuring that all of the lights in a building are off during the nighttime hours so that waste of utilities and funds are not present. In large commercial buildings and schools it becomes quite expensive to hire a custodian to check all of the rooms and areas in the building to make sure that the lights have been turned off during the nighttime hours. As a result of this, it has become very desirable to provide some means of reducing the lights that are on in a building, or providing some means for assuring that the lights have been automatically turned off during the nighttime hours.

The requirement that lights be turned off during the nighttime hours also must be tempered by the fact that many industrial buildings and schools have intermittent nighttime use. During this intermittent nighttime use some means must be provided for re-establishing the normal lighting circuits and for re-establishing the proper temperatures. The normal day-night setback type temperature control systems normally utilize a thermostat which can be manually overridden by an individual utilizing an area in which the temperature has been reduced. The idea of night setback of the lights associated with a day-night type temperature control system also must incorporate some type of override mechanism for re-establishment of the electric light circuits in order to be practical.

It is a primary object of the present invention to disclose an exceedingly simple pressure-electric interconnected system for night setback of both the temperature and lights within a building.

It is a further object of the present invention to disclose a system for turning off of illumination means in a building which can be economically coupled to the day-night temperature control system normally utilized in this type of structure.

Another object of the present invention is to disclose an environmental condition control system wherein the illumination means in the system are tied to the temperature control system by a simple pressure-electric type of relay, and which further have override means for re-establishment of both the temperature and lighting when necessary for evening or night occupancy.

Another object of the present invention is to disclose an environmental condition control system wherein an illumination means and temperature control system are tied together by a unique type of pressure-electric relay which automatically turns off the lights when the temperature control system is switched to night setback but which automatically provides for the re-establishment of any lights that are needed simply by turning on the normal light switches in the areas in which the system is installed.

These and other objects will become apparent when the present invention is fully considered along with the drawings, wherein.

Figure 1:
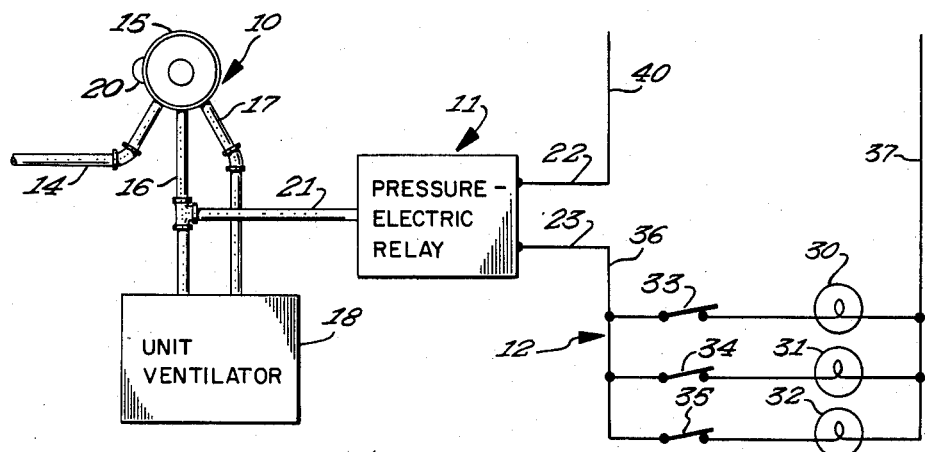
FIGURE 1 is a schematic representation of a simple environmental condition control system of the present invention.

In FIGURE 1 there is generally disclosed at 10 a pneumatic day-night temperature control system, which is connected to a pressure-electric relay means 11, that in turn connects the temperature control system 10 to electric illumination means 12 which is used for supplying light in an area in which the temperature control system is located and functions. The pneumatic day-night temperature control system 10 has a pneumatic supply line 14 connected to a pneumatic thermostat 15. The pneumatic thermostat 15 has two output pipes 16 and 17. The pipes 16 and 17 both supply pneumatic control pressures to a unit ventilator 18 or some other type of pneumatically controlled heat exchange device for tempering the air in the vicinity or area to which the thermostat 15 is exposed.

The pneumatic day-night temperature control system 10 is of a conventional type wherein pressure supplied to pipe 14 can be adjusted between two or more levels. In the very simplest system two pressures are utilized. A first pressure is utilized for normal daytime operation of the thermostat 15, whereas a second higher level of pressure switches the thermostat 15 to a lower temperature setting for nighttime operation. The pneumatic day-night temperature control system is well known in the art and is not necessarily limited to a two level operation. The pressure on pipe 14 may be a three level operation thereby providing for a daytime operation, a nighttime operation, and a mode of operation for transition between the nighttime and daytime levels. All of these are known in the art and the thermostat 15 is typified by the type of pneumatic thermostat disclosed in the United States Patent 2,828,077 to R. C. Mott, issued on March 25, 1958. This general type of thermostat is commercially sold by the assignee of the present application under the type number TP911C pneumatic round thermostat. The type of thermostat disclosed at 15 normally supplies a switching pressure on pipe 16 and a modulated pressure on pipe 17 to control the heat exchange device 18. Pipe 16 is normally referred to as a "sub main" while the pipe 17 is normally referred to as the "branch line." The thermostat 15 also incorporates a lever 20 that provides for manual override of the condition of operation set into the system by the pressure on pipe 14. For example, if the pressure supplied to pipe 14 has adjusted the thermostat 15 to a lower temperature level for nighttime operation, movement of the manual reset or override lever 20 will switch the thermostat 15 to its normal daytime setting thereby adjusting the unit ventilator 18 to a normal daytime mode of operation. This is accomplished by changing the pressure in pipe 16 to a level that corresponds to the pressures normally available in the daytime mode of operation.

Pipe 16 is connected by a pipe 21 to the pressure to electric relay means 11 and the pressure to electric relay means 11 has two conditions of operation. With a pressure available on pipe 21 corresponding to daytime operation, the pressure to electric relay means 11 has a completed circuit between two conductors 22 and 23. During the nighttime operation the pressure on pipe 16 is normally raised substantially thereby raising the pressure on pipe 21 to the pressure to electric relay means 11. This causes relay means 11 to disrupt the electric circuit between conductors 22 and 23 which in turn disconnects power to the illumination means 12.

Illumination means 12 is made up of the conventional lights in a room, such as a classroom, and are illustrated as lights 30, 31 and 32 which are connected through normal light switches 33, 34 and 35. The series combination of switch 33 and light 30 is connected between two conductors 36 and 37. The conductors 36 and 37 provide the energizing circuit for the parallel combinations of switch 34 and light 31, and switch 35 and light 32, as well as switch 33 and light 30. The conductor 36 is connected through the conductor 23 and the pressure electric relay means 11 to conductor 22. The conductor 22 is connected to conductor 40. Supplied between the conductors 40 and 37 is a conventional 110 volt, 60 cycle source that is normal in conventional lighting systems.

A very simple explanation of the mode of operation will clearly establish the relationship of the parts. If a pressure, such as 13 pounds per square inch is supplied on pipe 14 the thermostat 15 adjusts to daytime operation and the 13 pounds pressure are supplied to pipes 16 and 21. The pressure of 13 pounds per square inch to the unit ventilator 18 places the unit ventilator 18 in its mode of operation for daytime control and it responds to the daytime temperature setting of the thermostat 15. The pressure of 13 pounds per square inch on pipe 21 operates the pressure-electric relay means 11 so that the relay means 11 closes a circuit between conductors 22 and 23. This supplies the necessary line voltage to conductors 36 and 37 so that any or all of the lights 30, 31, or 32 can be operated by the appropriate operation of switches 33, 34, or 35. Upon the nighttime operation being desired, the pressure on pipe 14 is raised to 18 pounds per square inch. The rise in pressure causes the thermostat 15 to adjust to a lower temperature setting and also causes the pipe 16 to be supplied with the 18 pounds per square inch pressure. This adjusts the unit ventilator 18 to nighttime operation and also supplies the higher pressure to pipe 21 which in turn operates the pressure to electric relay means 11. The operation of the relay means 11 opens the circuit between conductors 22 and 23 thereby disconnecting all power to the lights 30, 31 and 32 regardless of the position of the switches 33, 34 or 35. If it becomes desirable to operate the lights 30, 31 or 32 during the night setback operation, it is merely necessary to move the override means 20 thereby reducing the pressure in pipe 16 to the pipe 13 pound per square inch level. This is a normal mode of operation of the thermostat 15, as is well known in the art. This immediately adjusts the pressure to electric relay means 11 to daytime pressures and connects conductors 22 and 23 together to supply power for the lights 30, 31 and 32.

It is thus apparent from the description of operation of the system of FIGURE 1 that the lights associated with the area to which the thermostat 15 controls are automatically turned off at any time the thermostat is set to nighttime operation. A manual override means is provided so that the normal operation can be re-established by anyone entering the area and operating the override means 20.

Figure 2:
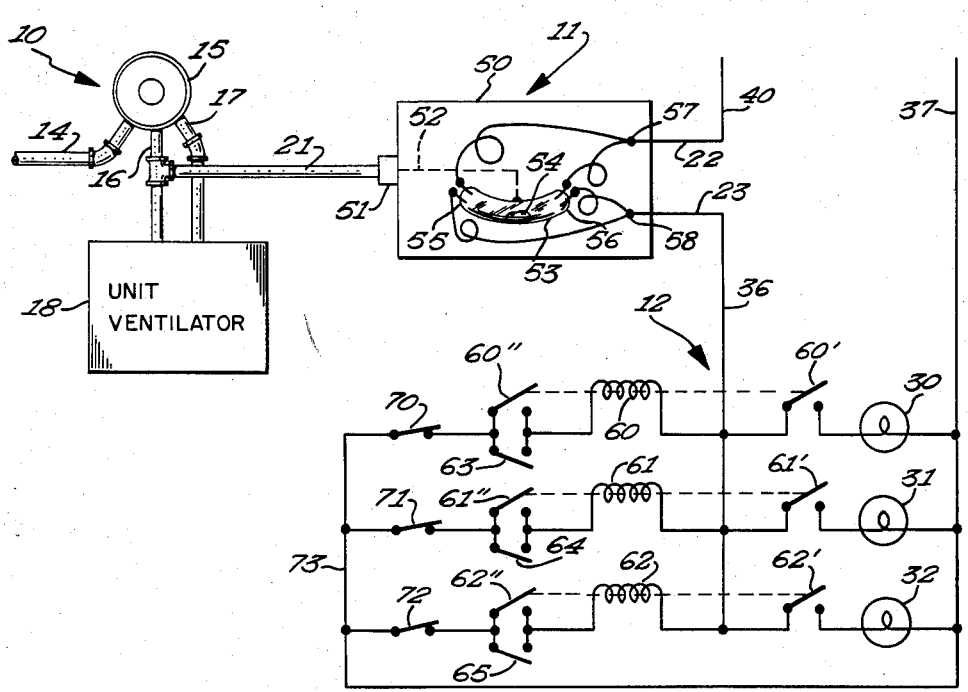
FIGURE 2 is a modification of the system incorporating an automatic reset arrangement.

In FIGURE 2 a similar system to that of FIGURE 1 is disclosed but a different type of pressure to electric relay means 11 is utilized. Where the system is identical, identical numbering will be noted. It is thus apparent that the same temperature control system 10 with the thermostat 15 and pipes 14, 16 and 17 is provided. The manual override lever 20 is not utilized as the system of FIGURE 2 does not require this function. Pipes 16 and 17 are again connected to the unit ventilator 18 while pipe 16 is also connected to pipe 21. In this case, the pressure to electric relay means 11 disclosed is different than the pressure to electric relay means of FIGURE 1. The pressure to electric relay means 11 has housing 50 that incorporates a pressure responsive member 51 that mechanically operates a lever 52 that tilts a mercury switch 53. The mercury switch 53 has a globule of mercury 54 that is free to move within the switch 53. At each end 55 and 56 of the mercury switch 53 are a pair of electrodes which are shorted by the mercury 54 when the switch is tilted to either extreme. The pair of electrodes at 55 and 56 are connected in parallel circuits to terminals 57 and 58. The terminals 57 and 58 connect to conductors 22 and 23 which correspond to those conductors in FIGURE 1. A supply of electric energy is again provided between conductors 40 and 37 so that electric energy can be supplied in turn between the conductors 36 and 37 to a series of lights 30, 31 and 32.

At this point the system also deviates from the system disclosed in FIGURE 1 in that the switch means for controlling the lights 30, 31 and 32 all are in the form of latching type relay means. Identical relay means 60, 61 and 62 are connected to the conductor 36 and relay means 60 has normally open contacts 60′ and 60″. In the case of relay 61 the normally open contacts are 61′ and 61″. Further in the case of relay 62 the normally open contacts are 62′ and 62″. The normally open contacts 60″, 61″ and 62″ each are paralleled by manually operated switches 63, 64 and 65. Connected in series with the switches 63, 64 and 65 are a series of normally closed push-button switches 70, 71 and 72. All of the switches 70, 71 and 72 are connected to a joint conductor 73 that is in turn connected to the conductor 37. It is apparent that when energy is supplied between conductors 36 and 37 that the operation of any one of the switches 63, 64 or 65 will energize its associated relay 60, 61 or 62. By way of example, the operation of relay 60 will be explained and it should be understood that the circuits associated with relays 61 and 62 operate in identical fashion.

When switch 63 is momentarily closed, electric energy is supplied through the relay 60 thereby closing the switches 60′ and 60″. The switch 60″ provides a holding circuit to keep the relay 60 energized while the switch 60′ completes an electric circuit to light 30 from the conductors 36 and 37. In order to turn out the light 30 it is merely necessary to momentarily open the switch 70 thereby disrupting the current to the relay 60 and this disruption breaks the holding circuit through the switch 60″. This switching arrangement is repeated for each of the relays 61 and 62 so that the lights 31 and 32 can be operated.

It is apparent from FIGURE 2 that anytime electric energy is supplied to conductors 36 and 37 it is possible to operate the lights 30, 31 and 32 by means of their associated relay circuits. The pressure to electric relay means 11 can best be understood by going through a simple explanation of operation. At a normal daytime setting, that is when a pressure 13 pounds per square inch is supplied on pipe 14, the thermostat 15 controls the unit ventilator 18 at the daytime temperature and the pipes 16 and 21 supply a pressure of 13 pounds per square inch to the operating mechanism formed of member 51 and lever 52. This tilts the mercury switch 53 so that the mercury 54 shorts the terminals at end 55. This supplies electric energy between the conductors 22 and 23 thereby completing the supply of power to the relays 60, 61 and 62 to provide the necessary control of the lights 30, 31 and 32. When the pressure to pipe 14 is increased to 18 pounds per square inch, the pressure on pipe 21 increases and the pressure responsive member 51 and lever 52 tilt the mercury switch 53 so that the mercury passes from end 55 to end 56. During this transition, as shown in FIGURE 2, the circuit between conductors 22 and 23 is completely broken. This then drops out any of the relays 60, 61 or 62 that might have been left in an energized condition. This in turn disconnects the lights 30, 31 and 32. During the transition, the relays are dropped out but the mercury 54 continues to move through a tilting of the switch 53 until the mercury 54 reaches end 56 thereby shorting out the electrodes and connecting the conductors 22 and 23 in circuit once again. This leaves the lighting system in a de-energized state, but further leaves it available for re-energization during the nighttime or lower temperature operational mode.

While the system has been described as operating between two fixed pressure levels, it is quite common to utilize a three pressure system. The present invention in no way excludes the third pressure. The means of providing for manual override of the shutdown of the illumination means, shown in two distinct forms in FIGURES 1 and 2, are by no means limitations on the many possible ways of obtaining either manual or automatic override of the night shutdown condition. The applicant also wishes to point out that the specific pressure-electric relay means disclosed in this application form no limitations but that various types of pressure to electric relay or control devices could be utilized. As such, it becomes obvious that the scope of the present invention can be varied extensively from the arrangement disclosed specifically in FIGURES 1 and 2. The applicant therefore wishes to be limited in the scope of his invention only by the scope of the appended claims.

I claim:

1. An environmental condition control system, comprising: a pneumatic day-night temperature control system including a pneumatic thermostat wherein a first pneumatic pressure operates said control system and said thermostat at a first temperature and a second pneumatic pressure operates said control system and said thermostat at a second temperature; electric illumination means including circuit holding means for supplying light in an area in which said temperature control system functions; a pressure-electric relay having connection means connected to said temperature control system and including a tiltable mercury switch response to said pressures; said relay intermittently opening an electric circuit through said switch by tilting said switch with changes in pressure between said first and said second pneumatic pressures supplied to said pressure-electric relay; and a source of electric energy connected in circuit with said switch and said electric illumination means; said switch connecting said source to said illumination means through said circuit holding means at said first pneumatic pressure and disconnecting said source from said illumination means by tilting said switch to intermittently open said switch and said holding circuit means when said first pressure is changed to said second pneumatic pressure.

2. An environmental condition control system, comprising: a pneumatic day-night temperature control system including a pneumatic thermostat wherein a first pneumatic pressure operates said control system and said thermostat at a first temperature and a second pneumatic pressure operates said control system and said thermostat at a second temperature; electric illumination means including circuit holding means for supplying light in an area in which said temperature control system functions; a pressure-electric relay having connection means connected to said temperature control system and including switch means response to said pressures; said relay intermittently opening an electric circuit through said switch means upon changes in pressure between said first and said second pneumatic pressures supplied to said pressure-electric relay; and a source of electric energy connected in circuit with said switch means and said electric illumination means; said switch means connecting said source to said illumination means through said circuit holding means at said first pneumatic pressure and disconnecting said source from said illumination means by operating said circuit holding means when said first pressure changes to said second pneumatic pressure.

3. An environmental condition control system, comprising: a pneumatic day-night temperature control system including a pneumatic thermostat wherein a first pneumatic pressure operates said control system at a first temperature and a second pneumatic pressure operates said control system at a second temperature; said pneumatic thermostat including manual override means to operate said control system at said first temperature and pressure when said temperature control system is supplied with said second pressure; electric illumination means for supplying light in an area in which said temperature control system functions; a pressure electric relay having connection means connected to said temperature control system and including switch means response to said pressures; and a source of electric energy connected in circuit with said switch means and said electric illumination means; said switch means connecting said source to said illumination means at said first pneumatic pressure and disconnecting said source from said illumination means at said second pneumatic pressure.

4. An environmental condition control system, comprising: a pneumatic day-night temperature control system including a pneumatic thermostat wherein a first pneumatic pressure operates said thermostat at a first temperature and a second pneumatic pressure operates said thermostat at a second temperature; electric illumination means for supplying light in an area in which said temperature control system functions; a pressure-electric relay having connection means connected to said temperature control system and including switch means response to said pressures; and a source of electric energy connected in circuit with said switch means and said electric illumination means; said switch means connecting said source to said illumination means at said first pneumatic pressure and disconnecting said source from said illumination means at said second pneumatic pressure.

5. A condition control system, including: temperature control system means having at least a first level and a second level of temperature control; electric illumination means for supplying light in an area in which said temperature control system means functions; relay means connecting said electric illumination means to a source of electric energy when said temperature control system means is operating at said first of said level of temperature control; said relay means disconnecting said electric illumination means from said source of electric energy when said temperature control system means changes to said second level of temperature control; and manual override means included in said temperature control system means to manually adjust said system means from said second level of temperature control to said first level of temperature control and thereby energize said electric illumination means.

6. A condition control system, including: pneumatic day-night temperature control system means wherein a first pneumatic pressure operates said system means at a first temperature and a second pneumatic pressure operates said system means at a second temperature; electrical illumination means for supplying light in an area in which said temperature control system means functions; pressure-electric relay means connected to said system means and operating in response to said pressures; said relay means further connected to said electric illumination means to supply a source of electric energy to said illumination means at said first pressure and to disconnect said source of electric energy from said illumination means upon said system means changing to said second pressure; and override means for connecting said electric illumination means to said source of electric energy regardless of the level.

7. A condition control system, including: pneumatic day-night temperature control system means wherein a first pneumatic pressure operates said system means at a first temperature and a second pneumatic pressure operates said system means at a second temperature; electric illumination means for supplying light in an area in which said temperature control system means functions; pressure-electric relay means connected to said system means and operating in response to said pressures; and said relay means further connected to said electric illumination means to supply a source of electric energy to said illumination means at said first pressure and to disconnect said source of electric energy from said illumination means upon said system means changing to said second pressure.

References Cited by the Examiner
UNITED STATES PATENTS

| | | | |
|---|---|---|---|
| 1,597,773 | 8/26 | Dodge | 236—1 |
| 1,720,723 | 7/29 | Dodge | 236—1 |

EDWARD J. MICHAEL, *Primary Examiner.*